United States Patent [19]

Matsushita et al.

[11] Patent Number: 5,295,038
[45] Date of Patent: Mar. 15, 1994

[54] ELECTROMAGNETIC CLUTCH

[75] Inventors: Takashi Matsushita; Yoshitaka Sunaga, both of Isesaki; Kouki Yoshizawa; Seiichi Hoshino, both of Gumna, Japan

[73] Assignee: Sanden Corporation, Gunma, Japan

[21] Appl. No.: 678,246

[22] Filed: Apr. 1, 1991

[30] Foreign Application Priority Data

Mar. 30, 1990 [JP] Japan .................................. 2-81301

[51] Int. Cl.$^5$ ........................................... H01H 47/00
[52] U.S. Cl. .................................... 361/152; 361/166; 361/170
[58] Field of Search ............... 361/139, 143, 152, 160, 361/166, 170, 206

[56] References Cited

U.S. PATENT DOCUMENTS

| Re. 33,140 | 1/1990 | Booth | 361/154 |
|---|---|---|---|
| 1,671,057 | 5/1928 | Brainard | 192/84 AB |
| 4,509,091 | 4/1985 | Booth | 361/154 |
| 4,567,975 | 4/1986 | Roll | 361/154 |
| 4,576,262 | 3/1986 | Motian et al. | 361/167 |
| 4,799,578 | 1/1989 | Matsushita | 192/84 C |
| 4,896,756 | 1/1990 | Matsushita | 192/84 C |

FOREIGN PATENT DOCUMENTS

| 368945 | 4/1932 | Fed. Rep. of Germany . |
|---|---|---|
| 1530785 | 6/1968 | France . |
| 2559222 | 8/1985 | France . |
| 88/09447 | 12/1988 | PCT Int'l Appl. . |

Primary Examiner—Jeffrey A. Gaffin
Attorney, Agent, or Firm—Baker & Botts

[57] ABSTRACT

An electromagnetic clutch assembly for use with a refrigerant compressor for an automotive air-conditioning system includes a first rotatable member, such as a rotor, having an axial end plate of magnetic material and a second rotatable member connected to an outer end of a drive shaft of the compressor. An armature plate of magnetic material is elastically connected to the second rotatable member. The armature plate faces the axial end plate of the rotor with an axial air gap therebetween. An electromagnetic device is disposed within the rotor and is operable to attract the armature plate into contact with the axial end surface of the rotor such that the rotation of the rotor can be transmitted to the drive shaft when the electromagnetic device is activated. The electromagnetic device includes at least first and second electromagnetic coils which are axially aligned so as to generate a thermal difference therebetween when heat is conducted to the electromagnetic device from a contact surface between the axial end plate of the rotor and the armature plate. The first and second coils are connected in series between the battery and ground. A control device controls the connection and disconnection of the electromagnetic device to the battery. The control device disconnects the electromagnetic device to the battery when the thermal difference exceeds a predetermined value while the electromagnetic device is activated.

9 Claims, 4 Drawing Sheets

ELECTROMAGNETIC CLUTCH

BACKGROUND OF THE INVENTION

1. Field of Invention

This invention relates to an electromagnetic clutch assembly, such as for use in controlling the transmission of power from an automobile engine to the refrigerant compressor in an automotive air-conditioning system and, more particularly, to an electromagnetic clutch assembly that includes an apparatus for interrupting the transmission of the driving force from an automobile engine to the compressor should the compressor become locked.

2. Description of the Prior Art

An automotive air-conditioning system typically includes a refrigerant circuit having a refrigerant compressor, a condenser, an expansion valve and an evaporator connected in series. The automobile engine provides the driving force for the compressor via a transmitting device, such as a driving belt, which is connected to the respective pulleys or rotors associated with the automobile engine and the compressor.

Generally, a rotor associated with the compressor forms a part of an electromagnetic clutch which can intermittently transmit the driving force from the automobile engine to the compressor by virtue of the intermittent energization of an electromagnetic coil of the electromagnetic clutch. The electromagnetic coil of the clutch intermittently energizes in response to a thermodynamic characteristic of the refrigerant circuit, such as the temperature of air leaving from the evaporator. The intermittent energization of the electromagnetic coil controls the intermittent operation of the compressor. Thereby, temperature in a passenger compartment of the automobile can be maintained at a certain value.

In addition, many devices utilize the driving force of an automobile engine, including automobile generators, oil hydraulic pumps for power assisted steering wheels and power assisted brakes, and refrigerant compressors. In recent years, in order to effectively utilize the restricted vacant space in an automobile engine compartment, the respective pulleys or rotors associated with the automobile engine and the devices driven by the engine are arranged to use only one driving belt.

Though space efficient, the above-described arrangement is extremely disadvantageous, especially if, for example, the driven device of the compressor, i.e., the drive shaft, should stop its rotational motion due to unexpected malfunctioning or trouble with the compressor's parts. Should the drive shaft stop while the rotor of the compressor is frictionally engaged with the armature plate (which is also connected to the drive shaft), the contacting surfaces of the rotor and armature plate will slide relative to each other, creating intense frictional heat. This heat will be conducted to a bearing which rotatably supports the drive shaft, and may cause seizure thereof. The seizure of the bearing intensifies the frictional heat generation of the rotor and armature plate. Consequently, the driving belt, unable to endure intensified heat, will burn and tear. As a result, the other devices utilizing the engine power transmitted by the driving belt will be rendered inoperative as well.

In order to overcome above-mentioned defect, Japanese Utility Model Application Publication No. 57-25222 discloses an electromagnetic clutch including a device which can immediately release the engagement between the rotor and the armature plate should the compressor become locked. This prior art clutch assembly for an automotive air-conditioning system is illustrated in FIG. 1.

Referring to FIG. 1, compressor housing 10 is provided with tubular extension 11 which surrounds drive shaft 20 of the compressor. Drive shaft 20 is rotatably supported in compressor housing 10 by a bearing (not shown).

Rotor 30 is rotatably supported on tubular extension 11 through bearing 12 which is mounted on an outer surface of tubular extension 11. Rotor 30 is made of magnetic material, such as steel, and comprises outer annular cylindrical portion 31, inner annular cylindrical portion 32 and axial end plate portion 33 connecting outer and inner cylindrical portion 31, 32 at one end. Thus, annular cavity 34 is defined by portions 31, 32 and 33. Annular V-belt groove 311 is formed on an outer peripheral surface of outer cylindrical portion 31 for receiving V-belt 40, which couples the compressor to the engine of the automobile (not shown). Axial end plate portion 33 has a frictional surface 331 formed on its outer surface and includes one or more concentric slits 332 to define a plurality of annular or arcurate pieces.

Annular housing 51 having a substantially U-shaped cross section is disposed in annular cavity 34 of rotor 30. Electromagnetic coil 50 is contained within annular housing 51. Housing 51 is fixed to supporting plate 52, which is secured to an axial end surface of compressor housing 10 by a plurality of rivets (not shown). Annular housing 51 is thus maintained within cavity 34 without contacting rotor 30. Thermal detecting element 54, including a fusible metal, is disposed in an end portion of annular cavity 510 defined by annular housing 51 so as to be adjacent to axial end plate portion 33 of rotor 30. Cavity 510 is filled with heated epoxy resin 511, which has been hardened by elapsing time and cooling, so as to fixedly and insulatedly dispose coil 50 and thermal detecting element 54 therewithin. Thermal detecting element 54 is connected in series with electromagnetic coil 50 between a battery (not shown) and ground potential. A first terminal end of thermal detecting element 54 is connected to the battery, and a second terminal end of thermal detecting element 54 is connected to a first terminal end of coil 50. A second terminal end of coil 50 is connected to a first terminal end of wire 53 which is led from a bottom end portion of annular housing 51. A second terminal end 53a of wire 53 is connected to one terminal end of another wire (not shown) led from a control apparatus (not shown) of the automotive air-conditioning system.

Hub 60 is disposed on a terminal end of drive shaft 20 and is secured to drive shaft 20 by nut 21 and key 22. Hub 60 is provided with flange portion 61 extending radially outwardly from an axial end portion of hub 60. Annular armature plate 70 is concentrically disposed around an outer surface of hub 60 so as to face axoal plate portion 33 of rotor 30 with a predetermined axial air gap. Armature plate 70 also comprises frictional surface 71 which faces frictional surface 331 of rotor 30. Armature plate 70 is provided with one or more slits 72 to define a plurality of annular or arcuate magnetic pieces. Armature plate 70 is elastically connected to flange portion 61 of hub 60 through a plurality of flexible leaf springs 80. One end portion of each leaf spring 80 is secured on the outer end surface of armature plate 70 by rivet 73. The other end portion of leaf spring 80 is secured on an axial end surface of flange portion 61 of hub 60 by rivet 611. Stopper plate 90 and washer 612 are also fixed on flange portion 61 of hub 60 by rivet 611.

In the above-described electromagnetic clutch, if coil 50 is not energized, armature plate 70 is biased away from rotor 30 by the recoil strength of leaf springs 80. When electromagnetic coil 50 is energized, a magnetic flux is induced and flows through a closed loop comprising coil 50, housing 51, rotor 30 and armature plate 70. Armature plate 70 is thus magnetically attracted to frictional surface 331 of rotor 30 and springs 80 are flexed in the axial direction. In this manner, armature plate 70 moves axially so that frictional surface 71 engages frictional surface 331. This engagement transmits the engine-driven rotation of rotor 30 through armature plate 70, leaf springs 80 and hub 60 to drive shaft 20 of the compressor.

If the compressor should become locked while armature plate 70 is contact with rotor 30, frictional surface 331 of axial end plate portion 33 of rotor 30 will slide on frictional surface 71 of armature plate 70. Intensive frictional heat is caused by this sliding frictional contact. Thus, rotor 30 and armature plate 70 are heated rapidly. If the frictional heat created by the frictional surfaces between armature plate 70 and rotor 30 exceeds the melting point of the fusible metal of thermal detecting element 54, the fusible metal will melt. Thereby, the flow of current from the battery to coil 50 is disconnected so that coil 50 is deenergized. Accordingly, armature plate 70 separates from frictional surface 331 of axial end plate portion 33 of rotor 30 by the recoil strength of leaf springs 80. Therefore, rotor 30 idly rotates and V-belt 40 is protected from damage. Thus, other devices which utilize the driving force of the automobile engine can remain operable, even if the refrigerant compressor becomes locked.

However, the above-describe prior art solution presents further disadvantages. Since thermal detecting element 54 is disposed in the right end portion of annular cavity 510 of annular housing 51, the size of coil 50 must be reduced in relation to the volume of cavity 510, thereby decreasing the magnetic attraction force which acts between rotor 30 and armature plate 70. Furthermore, thermal detecting element 54 may fail due to the breaking of the fusible metal caused by the intensive vibration which propagates to, or is generated at, the electromagnetic clutch.

SUMMARY OF THE INVENTION

Accordingly, it is an object of the present invention to provide an electromagnetic clutch assembly, including a device which can operate to interrupt the transmission of a driving force from an automobile engine to a refrigerant compressor when the refrigerant compressor becomes locked, without necessitating a reduction in the size of the electromagnetic coil.

It is yet another object of the present invention to provide an electromagnetic clutch assembly, including a device which can operate to interrupt the transmission of a driving force from an automobile engine to a refrigerant compressor when the refrigerant compressor becomes locked, regardless of the intensive vibration propagated to, or generated at, the electromagnetic clutch assembly.

The electromagnetic clutch assembly of the present invention is described herein for assembly on a refrigerant compressor of an automotive air-conditioning system. It includes a first rotatable member, such as a rotor, having an axial end plate of magnetic material. A second rotatable member is connected to an outer end of a drive shaft of the compressor. An annular armature plate of magnetic material is elastically connected to the second rotatable member so that the armature plate is capable of limited axial movement. The armature plate faces the axial end plate of the rotor with an axial air gap therebetween. An electromagnetic device is associated with the rotor and is operable to attract the armature plate into contact with the axial end plate of the rotor such that the rotation of the rotor can be transmitted to the drive shaft through the armature plate when the electromagnetic device is activated.

The electromagnetic device includes at least two axially-aligned electromagnetic coils. A thermal difference between the two electromagnetic coils is generated when heat is conducted to the electromagnetic device from a contact surface between the axial end plate of the rotor and the armature plate. The electromagnetic coils are connected in series between a battery and ground. A control device controls the connection and disconnection of the electromagnetic device to the battery. The control device disconnects the electromagnetic device to the battery when the thermal difference between the coils exceeds a predetermined value while the electromagnetic device is activated.

DETAILED DESCRIPTION OF THE PREFERRED EMBODIMENTS

Figure 1:
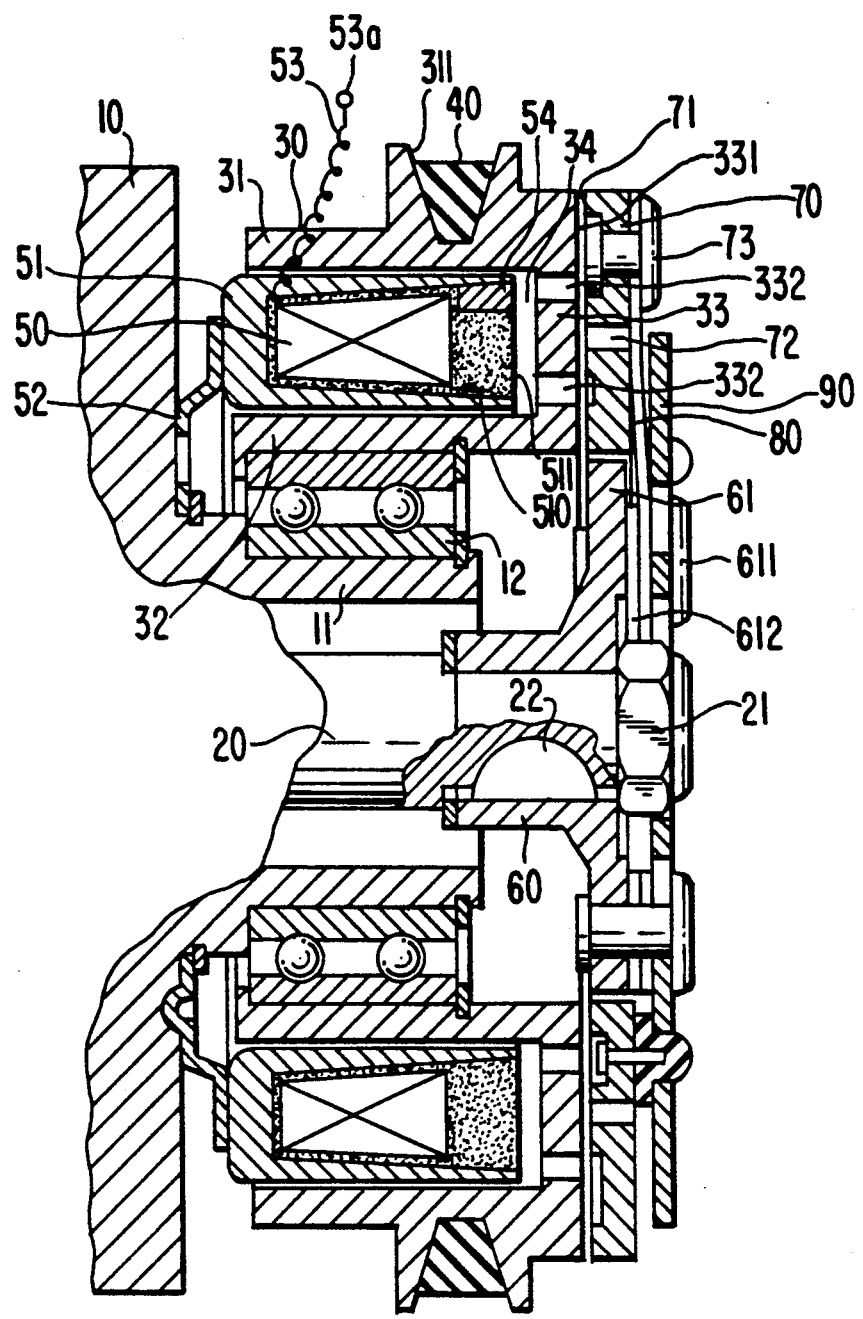
FIG. 1 illustrates a cross-sectional view of an electromagnetic clutch assembly in accordance with one embodiment of the prior art.
Figure 2:
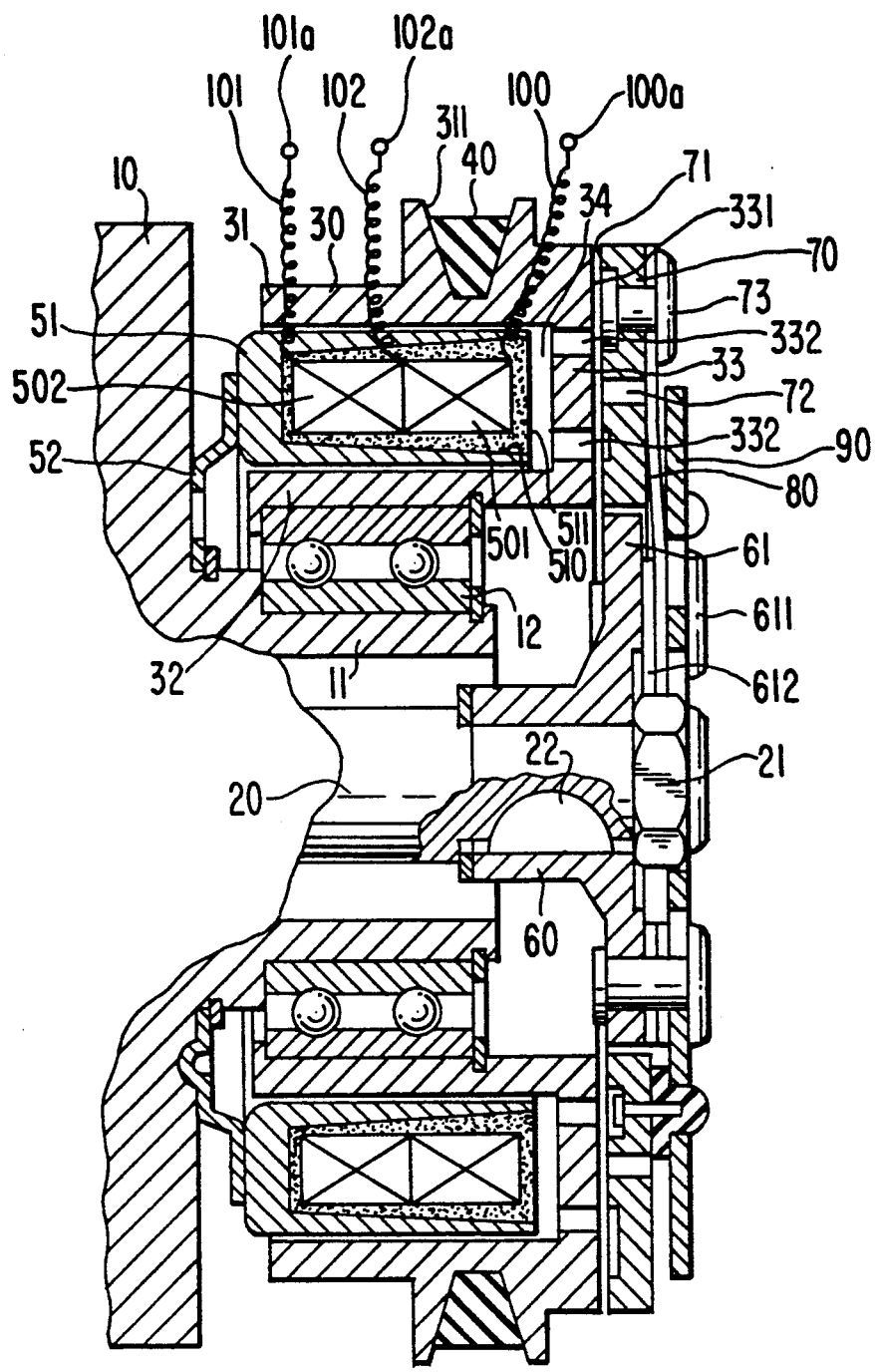
FIG. 2 illustrates a cross-sectional view of an electromagnetic clutch assembly in accordance with a first embodiment of the present invention.
Figure 3:
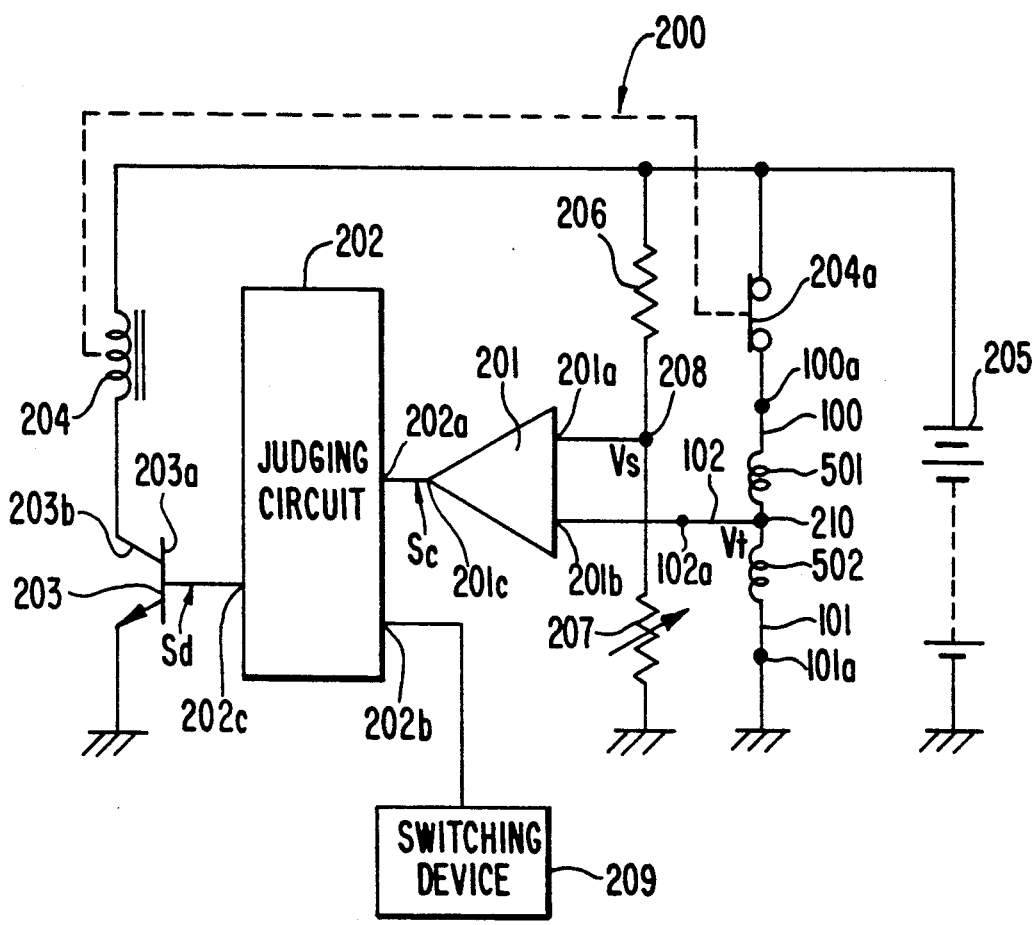
FIG. 3 illustrates a circuit diagram of a control device which controls operation of the electromagnetic clutch assembly shown in FIG. 2.
Figure 4:
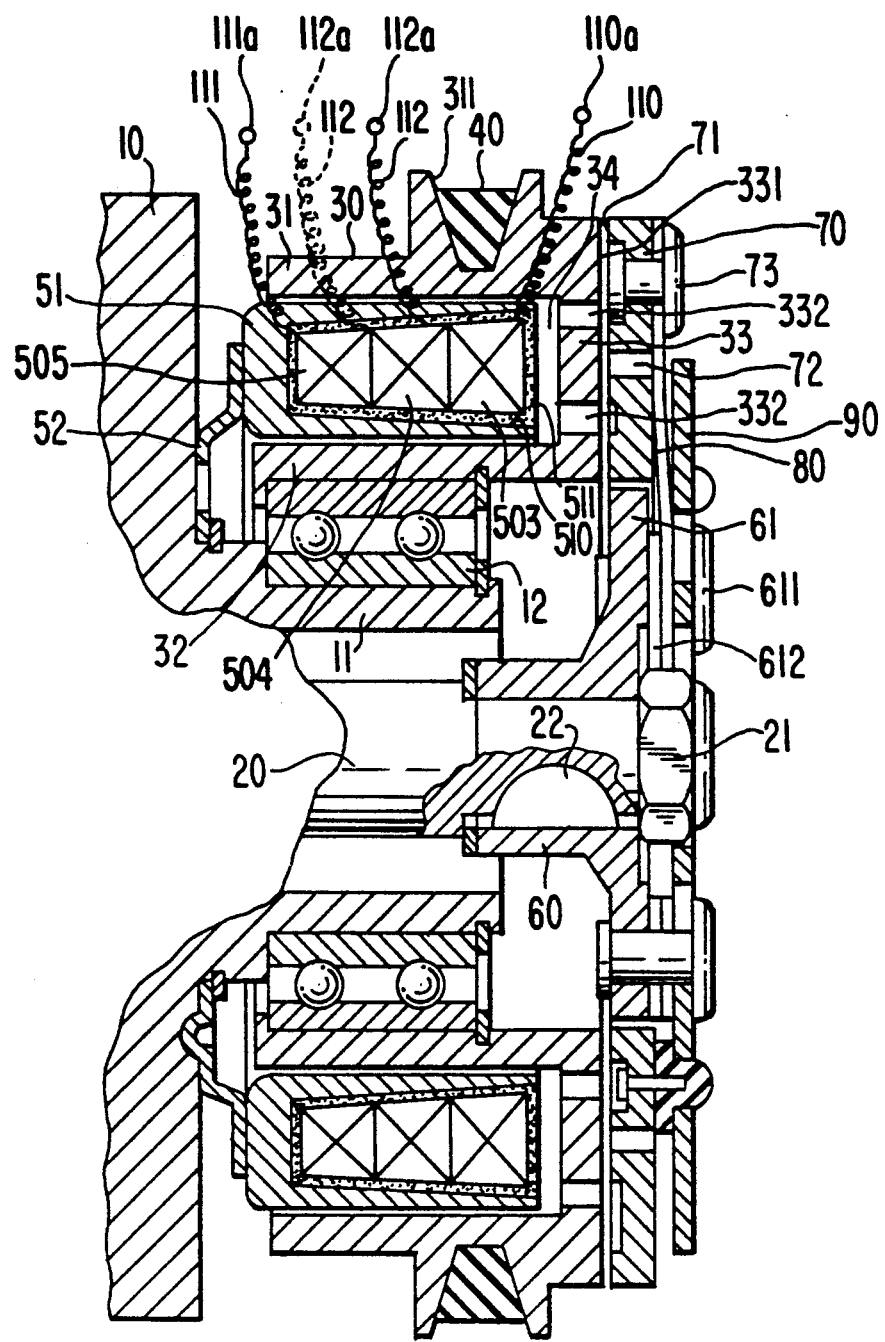
FIG. 4 illustrates a cross-sectional view of an electromagnetic clutch assembly in accordance with a second embodiment of the present invention.

In FIGS. 2-4, the same numerals are used to denote corresponding elements shown in FIG. 1, so that a detailed explanation thereof is omitted.

Referring to FIG. 2, the construction of an electromagnetic clutch assembly in accordance with a first embodiment of the present invention is illustrated. The electromagnetic clutch according to the first embodiment of the present invention is assembled on a refrigerant compressor which forms a part of an automotive air-conditioning system. The electromagnetic clutch includes first and second electromagnetic coils 501 and 502 disposed in cavity 510 of annular housing 51. From the right to the left, first and second coils 501, 502 are respectively disposed in cavity 510, so that first coil 501 is adjacent to axial and plate portion 33 of rotor 30.

A first terminal end of first coil 501 is coupled to a first terminal end of first wire 100. A second terminal end of first coil 501 is coupled to a first terminal end of second coil 502. A second terminal end of second coil 502 is coupled to a first terminal end of second wire 101.

Referring to FIG. 3, control device 200 for controlling the operation of the electromagnetic clutch includes comparator 201, judging circuit 202, common-emitter type switching transistor 203 and electromagnetic relay 204 having normally closed contact 204a.

First and second coils 501 and 502 are connected in series between battery 205 and ground. A second terminal end 100a of first wire 100 is connected to power supply, i.e. battery, 205 through normally closed contact 204a. A second terminal end 101a of second wire 101 is grounded.

Resistor 206 and rheostat 207 are connected in series between battery 205 and ground. A first terminal end of resistor 206 is connected to battery 205 and a first terminal end of rheostat 207 is grounded. One input terminal 201a of comparator 201 is connected to point 208 between resistor 206 and rheostat 207. The other input terminal 201b of comparator 201 is connected to a first terminal end 102a of third wire 102, of which a second terminal end is connected to point 210 between first and second coils 501, 502. Output terminal 201c of comparator 201 is connected to a first input terminal 202a of judging circuit 202. A second input terminal 202b of judging circuit 202 is connected to switching device 209 in which an automotive air-conditioning switch (not shown) and a thermistor switch (not shown) are connected in series. The thermistor switch is turned on in order to energize coils 501, 502 when the temperature of the air leaving from an evaporator, which forms a part of the automotive air-conditioning system, exceeds a predetermined value. Output terminal 202c of judging circuit 202 is connected to base 203a of transistor 203. Collector 203b of transistor 203 is connected to a first terminal end of electromagnetic relay 204. A second terminal end of electromagnetic relay 204 is connected to the first terminal end of resistor 206, thereby being connected to battery 205.

Voltage Vs at point 208 is adjusted by rheostat 207 to have predetermined value Vs1 which is smaller than voltage Vt at point 210 between first and second coils 501, 502 at a time when the refrigerant compressor intermittently operates by a predetermined differential. Comparator 201 generates level 1 of binary signal Sc only when voltage Vt is smaller than predetermined value Vs1.

Control device 200 for controlling operation of the electromagnetic clutch performs in the following manner. When the refrigerant compressor intermittently operates, voltage Vt at point 210 is greater than predetermined voltage Vs1. This is true both when frictional surface 331 of rotor 30 engages with frictional surface 71 of armature plate 70 and when frictional surface 331 of rotor 30 does not engage with frictional surface 71 of armature plate 70. Accordingly, comparator 201 generates level 0 of binary signal Sc, and sends it to judging circuit 202 from output terminal 201c. When level 0 of binary signal Sc is received in judging circuit 202, judging circuit 202 determines whether switching transistor 203 will be turned on or off, depending upon the signal received by judging circuit 202 from switching device 209.

Accordingly, when the temperature of the air leaving from the evaporator exceeds a predetermined value while the automotive air-conditioning switch is turned on, switching device 209 sends an on-signal to judging circuit 202. Judging circuit 202 thus generates level 0 of binary signal Sd, and sends it to base 203a of switching transistor 203 from output terminal 202c. When base 203a of switching transistor 203 receives level 0 of binary signal sd, switching transistor 203 is turned off, and electromagnetic relay 204 is deenergized. Deenergization of electromagnetic relay 204 keeps contact 204a closed so that coils 501, 502 are energized. Accordingly, rotor 30 and armature plate 70 maintain frictional engagement and the refrigerant compressor maintains operation.

On the other hand, when the temperature of the air leaving from the evaporator does not exceed a predetermined value or when the automotive air-conditioning switch is turned off, switching device 209 sends an OFF signal to judging circuit 202. Judging circuit 202 generates level 1 of binary signal Sd and sends it to base 203a of switching transistor 203 from output terminal 202c. When base 203a of transistor 203 receives level 1 of binary signal Sd, switching transistor 203 is turned on, and electromagnetic relay 204 is energized. Energization of electromagnetic relay 204 opens contact 204a, thereby deenergizing coils 501, 502. Accordingly, the frictional engagement between rotor 30 and armature plate 70 is released by virtue of the recoil strength of leaf springs 80. Therefore, the refrigerant compressor stops its operation.

If the refrigerant compressor should become locked unexpectedly, due to malfunctioning of its component parts while rotor 30 is frictionally engaged with armature plate 70, frictional surface 331 of rotor will slide on frictional surface 71 of armature plate 70 so that intensive frictional heat will be generated therebetween. The intensive frictional heat will be conducted to first and second coils 501, 502 and cause an increase in the electric resistance thereof. Since first coil 501 is disposed closer to frictional surface 331 of rotor 30 than second coil 502, first coil 501 will be more heated than second coil 502. Therefore, the increase in electric resistance of coil 501 will be greater than the increase in electric resistance of coil 502. As a result, voltage Vt at point 201 between first and second coils 501, 502 will be reduced to a value which is smaller than predetermined value Vs1 so that comparator 201 will generate level 1 of binary signal Sc, and send it to judging circuit 202 from output terminal 201c. When level 1 of binary signal Sc is received in judging circuit 202, judging circuit 202 determines whether switching transistor 203 will be turned on or off. In this case, the judging circuit 202 will generate level 1 of binary signal Sd at output terminal 202c, even if judging circuit 202 receives an ON-signal from switching device 209, that is, when the temperature of the air leaving from the evaporator exceeds a predetermined value while the automotive air-conditioning switch is turned on. Base 203a of switching transistor 203 receives level 1 of binary signal Sd, and switching transistor 203 is turned on so that electromagnetic relay 204 is energized. Energization of electromagnetic relay 204 opens contact 204a, thereby deenergizing coils 501, 502. Accordingly, the frictional engagement between rotor 30 and armature plate 70 is released by virtue of the recoil strength of leaf springs 80. Rotor 30 idly rotates and V-belt 40 is prevented from being damaged. Accordingly, other devices which are being driven by the automobile engine are maintained in an operable condition.

In the present invention, annular cavity 510 of annular housing 51 holds only electromagnetic coils 501, 502. Therefore, the size of coils 501, 502 can be large enough to occupy substantially the entire volume of cavity 510. Thus, the magnetic attraction force acting between rotor 30 and armature plate 70 need not be reduced. Furthermore, there is no risk of failure or erroneous operation of control device 200 from intensive vibration propagation to, or generation at, the electromagnetic clutch.

Referring now to FIG. 4, the construction of an electromagnetic clutch assembly in accordance with a second embodiment of the present invention is illustrated. The electromagnetic clutch assembly includes first, second and third electromagnetic coils 503, 504 and 505 disposed in cavity 510 of annual housing 51. From the right to the left, first, second and third coils 503, 504 and 505 are respectively disposed in cavity 510, so that first coil 503 is adjacent to axial end plate portion 33 of rotor 30. A first terminal end of first coil 503 is connected to a first terminal end of first wire 110. A second terminal end of first coil 503 is connected to a first terminal end of second coil 504. A second terminal end of second coil 504 is connected to a first terminal end of third coil 505. A second terminal end of third coil 505 is connected to a first terminal end of second wire 111.

Referring again to FIG. 3, in the second embodiment, first second and third coils 503, 504 and 505 are connected in series between battery 205 and ground in place of first and second coils 501, 502 of the first embodiment. Therefore, a second terminal end 110a of first wire 110 is connected to battery 205 through normally closed contact 204a, and a second terminal end 11a of second wire 111 is grounded. Either a point between first and second coils 503, 504 or a point between second and third coils 504, 505 is connected to a first terminal end of third wire 112. A second terminal end 112a of third wire 112 is connected to the second input terminal 201b of comparator 201. An effect of this embodiment is similar to an effect of the first embodiment so that a detailed explanation thereof is omitted.

Furthermore, as has been described with respect to the first and second embodiments, the second terminal end of the first wire is connected to battery 205 through normally closed contact 204a, and the second terminal end of the second wire is grounded. Alternatively, the second terminal end of the second wire can be connected to battery 205 through normally closed contact 204a, and the second terminal end of the first wire can be grounded. In this alternative arrangement, voltage Vs at point 208 is adjusted by rheostat 207 to have predetermined value Vs2 which is greater than voltage Vt at a point either between the first and second coils or between the second and third coils at a time when the refrigerant compressor intermittently operates by a predetermined differential. Comparator 201 generates level 1 of binary signal only when voltage Vt is greater than predetermined value Vs2.

Still further, in the above-mentioned embodiments, two or three electromagnetic coils are disposed in cavity 50 of annular housing 51. However, it is contemplated within the scope of the present invention that more than three electromagnetic coils may be disposed in cavity 510. An effect similar to that achieved by the above-mentioned embodiments can thereby be obtained by utilizing the thermal differential between coils as described above.

This invention has been described in detail in connection with the preferred embodiments. These embodiments, however, are merely exemplary, and not restrictive of the invention. It will be understood by those skilled in the art that other variations and modifications can easily made within the scope of this invention as defined by the claims.

We claim:

1. In an electromagnetic clutch assembly including a first member rotatable about an axis and having an axial end plate of magnetic material, a second member rotatable about said axis, an armature plate of magnetic material flexibly coupled to said second rotatable member so that said armature plate is capable of limited movement along said axis, said armature plate facing said axial end plate of said first rotatable member with an axial air gap therebetween, and an electromagnetic device associated with said first rotatable member of attracting said armature plate into contact with said axial end plate such that the rotation of said first rotatable member can be transmitted to said second rotatable member through said armature plate when said electromagnetic device is activated, the improvement comprising:

a plurality of electromagnetic coils, said electromagnetic coils axially aligned such that a thermal differential is signal generated between said electromagnetic coils when heat is conducted to said electromagnetic device; and control means for controlling activation of said electromagnetic coils in response to said thermal differential signal.

2. The electromagnetic clutch assembly according to claim 1, wherein said plurality of electromagnetic coils is two.

3. The electromagnetic clutch assembly according to claim 1, wherein said plurality of electromagnetic coils is three.

4. The electromagnetic clutch assembly of claim 1, wherein said plurality of electromagnetic coils are connected in series between a power supply and ground potential and said control means disconnects said electromagnetic coils from said power supply when said thermal differential signal exceeds a predetermined value while said electromagnetic coils are activated.

5. The electromagnetic clutch assembly according to claim 4, said control means comprising:

switching means of disconnecting said electromagnetic coils from said power supply in response to a comparison of a voltage at a point between two of said electromagnetic coils and a predetermined voltage.

6. The electromagnetic clutch assembly according to claim 4, said control means comprising:

comparing means for comparing a predetermined voltage with a voltage at a point between two of said plurality of electromagnetic coils, said comparing means generating a first signal when a differential between said predetermined voltage and said voltage at said point between two of said plurality of said electromagnetic coils exceeds a predetermined value;

judging means for receiving said first signal from said comparing means, for receiving a second signal indicative of the activation state of said electromagnetic coils and for generating a third signal when said judging means receives both said first signal and said second signal indicating that said electromagnetic coils are activated; and switching means for disconnecting said electromagnetic coils from said power supply when said switching means receives said third signal.

7. The electromagnetic clutch assembly according to claim 6, wherein said comparing means comprises a comparator.

8. The electromagnetic clutch assembly according to claim 6, wherein switching means comprises a common-emitter type switching transistor and an electromagnetic relay having a normally closed contact which is connected between said power supply and said electromagnetic device, said common-emitter type switching transistor and said electromagnetic relay being connected in series between said power supply and ground potential.

9. The electromagnetic clutch assembly according to claim 8 wherein said electromagnetic relay is energized when said common-emmitter type switching transistor receives said third signal.

* * * * *